United States Patent Office 3,595,698
Patented July 27, 1971

3,595,698
HYDRAZINE FUEL CELL WITH ACRYLIC ACID POLYMER MEMBRANE
Karl Victor Kordesch, Lakewood, Ohio, assignor to Union Carbide Corporation, New York, N.Y.
No Drawing. Filed Oct. 3, 1968, Ser. No. 764,965
Int. Cl. H01m 27/26
U.S. Cl. 136—86        5 Claims

ABSTRACT OF THE DISCLOSURE

Alkali metal salts of ethylene-acrylic acid copolymers are useful as selective, ion permeable membranes for permeable membranes for hydrazine-air fuel cells and permit operation of the cell at high fuel concentrations.

---

This invention relates to an electrochemical cell which utilizes hydrazine as a fuel. In one aspect, this invention relates to a fuel cell which can operate at high fuel concentrations. In a further aspect, this invention is directed to the use of selective, ion permeable membranes as separators in fuel cells.

Fuel cells which employ hydrazine as a fuel have been known for several years. Such fuel cells generally comprise an anode capable of reacting electrochemically with hydrazine with the production of electric current (hereinafter referred to as a "hydrazine anode"), a cathode to which is supplied the oxidant employed in the fuel cell, an electrolyte in contact with the electrodes, means for supplying oxidant to the cathode and means for supplying hydrazine to the anode. The usual method for supplying hydrazine to the anode is by dissolving the hydrazine in the electrolyte, preferably an aqueous alkaline electrolyte.

Prior art hydrazine anodes typically comprised a porous metal or other porous material which was capable of promoting electrochemical decomposition of hydrazine in contact with the anode, for example, porous nickel or porous Raney nickel. In addition, catalytic materials were often deposited on the porous material, generally metals or compounds of metals from Group VIII of the Periodic Table, for example, the noble metals or heavy metal borides such as nickel boride or cobalt boride.

In practice the hydrazine concentration in the electrolyte must be kept relatively low, i.e., in the range of from about 0.3 to 0.8 percent, otherwise direct chemical attack occurs at the air cathode if it is given no special protection. Hence, hydrazine-air fuel cells are normally provided with a sophisticated fuel injection an monitoring mechanism to periodically supply fresh fuels as it is consumed by the electrochemical reaction and to control the maximum fuel concentration. However, in present methods of monitoring the hydrazine concentration in the electrolyte of a hydrazine fuel cell the total output voltage of the fuel cell battery is monitored and a change in this voltage actuates an electrical switch opening an electromagnetic fuel valve and introducing hydrazine into the electrolyte system. The prime disadvantage of this method is that the net battery voltage invariably includes the cathode potential which tends to vary with time and operating conditions. Also, should there be an over-injection of hydrazine into the system in response to a drop in total battery voltage due, for example, to a slowdown in the electrolyte pumping system or air cooling system, the hydrazine monitoring and injecting system would be unable to recover because of the tendency to inject even more hydrazine to compensate for the decreased voltage, resulting eventually in complete flooding of the system with the hydrazine fuel.

Separate monitoring means for controlling hydrazine concentration which are independent of the main fuel cell battery voltage have also been suggested. However, such separate monitoring devices, have a very low sensitivity because the change in voltage with hydrazine concentration for a single cell is relatively small compared to the total battery voltage.

It would therefore be desirable to have a fuel cell which could operate at relatively high concentrations of hydrazine in the electrolyte, and thus require only occasional fuel injection by means of, for example, a single solenoid valve. However, it has been observed that some means for limiting hydrazine transport from the anode to the cathode compartments is essential when a relatively high concentration of hydrazine is present in the electrolyte. As previously indicated, protection of the air cathode from contact with large amounts of hydrazine is necessary in order to prevent a severe "chemical short" which would not only overpolarize the cathode, but would unnecessarily consume hydrazine fuel and generate considerable heat.

Although cells can operate without a barrier or membrane if the hydrazine concentration is maintained below about 1 percent, the use of concentrations in the 10 to 30 percent range necessitates its use. For instance, in an attempt to operate a fuel cell containing no membrane or other means to restrict hydrazine transport, when an electrolyte containing 10 percent hydrazine was added, very violet gassing occurred and the cell became very hot. In contrast, a similar cell containing the membranes disclosed herein, showed a temperature rise of less than 15° C. during a one and one half hour operating period at a current density of 25 a.s.f.

It is therefore apparent that if no special protection is given to the air cathode, a low hydrazine concentration must be employed and the monitoring means must be highly sophisticated. In the event that the air cathode could be protected from direct chemical reaction, it would be possible to utilize a higher hydrazine concentration, less sophisticated monitoring means and an overall improvement in operation.

Accordingly, one or more of the following objects will be achieved by the practice of this invention. It is an object of this invention to provide a fuel cell which can operate at high fuel concentrations. Another object of this invention is to provide a hydrazine-air fuel cell which can operate at hydrazine concentrations of up to 30 percent in the electrolyte. A further object of this invention is to provide a fuel cell which employs as a separator a selective, ion permeable membrane. A still further object of this invention is to provide a selective, ion permeable membrane which is an alkali-acrylate-acrylic acid-polyethylene copolymer. These and other objects will readily become apparent to those skilled in the art in the light of the teachings herein set forth. In its broad aspect, the invention is directed to a fuel cell comprising, in combination, at least one hydrazine anode, at least one oxidant cathode, current collecting means associated with the anode and cathode, and an electrolyte containing hydrazine, the cathode being separated from the hydrazine in the electrolyte by a selective, ion permeable membrane comprised of alkali metal salts of ethylene-acrylic acid copolymers. Due to the presence of the membrane, relatively high concentrations of hydrazine, i.e., 10 to 30 percent in the electrolyte can be employed and the need for replenishing the fuel at frequent intervals substantially reduced.

As hereinbefore indicated, the selective, ion permeable membranes which are employed in the fuel cells of this invention are alkali metal salts of ethylene-acrylic acid copolymers.

The ethylene-acrylic acid copolymers are prepared by the polymerization of ethylene and acrylic acid (or methacrylic acid) by known techniques described in the literature. The copolymers, prior to conversion to the salts, are characterized by a molecular weight as expressed by a melt index of from about 1 to about 1000 decigrams per minute (dg./min.). The molecular weights of the ethylene-acrylic acid interpolymers are indicated in terms of melt index at 44 p.s.i. and 190° C. in units of decigrams per minute (dg./min.) in conformity with ASTM D-1238-62T. The copolymers contain from about 10 to about 50 percent by weight of an acrylic acid having 3 to 4 carbon atoms interpolymerized therein, and with the alkali metal salt moieties, i.e., sodium or potassium, comprising about 10 to 55 by weight of the total ethylene-acrylic acid interpolymer salt.

The term "acrylic acid" is used herein to include acrylic acid as well as methacrylic acid.

Although membranes which are useful in the present invention can be prepared from ethylene-acrylic acid copolymers having melt indices of about 1 dg./min. to 1000 dg./min. and containing about 10 to 50 percent by weight of an acrylic acid having 3 to 4 carbon atoms interpolymerized therein, it is preferred to employ those copolymers in the range of about 20 dg./min. to 500 dg./min. containing about 10 percent to 30 percent acrylic acid interpolymerized therein. Furthermore, although the alkali metal salts of these interpolymers can contain from about 10 percent to 55 percent by weight of acrylic acid salt moieties, it is preferred to employ about 10 percent to 30 percent.

Ethylene-acrylic acid copolymer alkali metal salts can be prepared with varying salt contents. The neutralization of these ethylene-acrylic acid copolymers can be effected by contacting them with free alkali metal, with alkali metal salts such as formates, acetates, nitrates, carbonates, or bicarbonates and with alkali metal bases such as hydroxides or alkoxides. Preferred alkali metal bases include sodium hydroxide and potassium hydroxide in solution, slurry or in the melt. For convenience, it is preferred to blend the copolymer and base on a two roll mill, in a Banbury mixer or with similar commercially available mixing equipment well known in the art. The salt content of a given copolymer can be determined by infrared analysis of a film specimen in the 5.0 to 6.0μ region. In practice, complete neutralization of the acrylic acid moiety is not desired to achieve the membranes useful in the present invention. Thereafter, the copolymer can be formed into a membrane or film by one or more calendering techniques known in the art.

In practice, the thickness of the membranes can vary from about 0.5 to about 5 mils. Particularly preferred membranes are those having a thickness of from about 1 to about 4 mils.

The oxygen transmission rates of the copolymer salts employed in this invention are in the range of about 200 to 300 cc./100 inches $^2$/24 hrs./mil. at about 23° C., 0 percent relative humidity (RH) and one atmosphere and 900 to 1000 cc./100 inches $^2$/24 hrs./mil at 75 percent RH 23° C.

The carbon dioxide transmission rates of the salts are in the range of about 600 to 800 cc./100 inches $^2$/24 hrs./mil at 23° C., 0 percent RH.

The water vapor transmission rates of the copolymer salts are at least 40 g./meter $^2$/24 hrs./mil, up to 2500 g./meter $^2$/24 hrs./mil.

As previously indicated, the membranes of this invention are selective in that they permit the passage of water and the alkali metal ions in the electrolyte but retain hydrazine. This is in contrast to conventional microporous membranes such as asbestos, polyvinylchloride, and the like which do not prevent passage of hydrazine.

One important feature of the membranes is the current-dependent transport of electrolyte. During operation of the fuel cell, the volume of electrolyte will increase in the cathode compartment and decrease in the anode compartment. This transport involves transfer of both water and potassium ions. Because of this phenomenon, a bypass must be made between the two compartments to permit overflow of excess catholyte to the anode compartment. This transport is quite beneficial since it permits internal circulation through the membranes and thus promotes more rapid water transpiration. If the bulk anolyte were restricted to its own compartment, and osmosis alone functioned to transport water from the anode to the cathode chambers, the problem of maintaining a water balance would be much more difficult and the cathode would soon be dry.

The following examples are illustrative:

EXAMPLE 1

A series of ethylene-acrylic acid copolymers (1180 grams) containing 18 percent acrylic acid copolymerized therein and having a melt index of 200 were mixed with varying amounts of solid sodium hydroxide and 5 grams of water in a Banbury mixer at 150° C. for twenty minutes. Partial neutralization of the acrylic acid moieties was achieved as evidenced by infrared and other analysis of the sodium salts the moisture vapor transmission of films prepared from the salts was measured and compared with an ethylene-acrylic acid copolymer control. The results obtained are set forth in Table 1 below:

TABLE 1

| Run No. | Base resin MI | Percent AA [1] | Alkali metal acrylate, wt. percent | Moisture vapor transmission [2] |
|---|---|---|---|---|
| 1 | 490 | 23 | [3] 25.0 | 42,250 |
| 2 | 200 | 18 | [5] 15.1 | 918 |
| 3 | 145 | 18 | [5] 13.2 | 860 |
| 4 | 145 | 18 | [5] 11.3 | 55 |
| 5 | 145 | 18 | [5] 12.5 | 77 |
| Control | 10 | 13 | 0 | 11 |

[1] Acrylic acid content.
[2] G./meter$^2$/24 hrs. at 95% RH, 100° F.; 5-8 mil plaques.
[3] Potassium acrylate.
[4] G./meter$^2$/24 hrs. at 95% RH, 100° F.; 1.5 mil film.
[5] Sodium acrylate.

EXAMPLE 2

Films of a copolymer salt containing 11.7 weight percent sodium acrylate, 82.3 weight percent ethylene and 6.0 weight percent acrylic acid were prepared by the procedure of Example 1 from an ethylene-acrylic acid copolymer containing approximately 15 weight percent acrylic acid and having a melt index of approximately 200 dg./min. The copolymer salt was extruded into a film having a thickness of 2 mils. The film was then placed in a standard hydrazine-air fuel cell as a membrane to separating the air-cathode from the hydrazine in the electrolyte. The electrolyte employed was 7 molar potassium hydroxide containing 20 percent hydrazine. After an initial break in period IR-drop measurements at 25 a.s.f. were obtained and found to be 163 mv. The efficiency was found to be 61 percent.

EXAMPLE 3

In a manner similar to that employed in Examples 1 and 2, membranes were prepared by partially neutralizing ethylene-acrylic acid copolymers and extruding them into films. These membranes were then employed in a standard hydrazine-air fuel cell and which utilized as the electrolyte 7MKOH containing 20 percent hydrazine. The composition of polymer, efficiency and IR drops are set forth in Table 2 below:

TABLE 2.—USE OF ALKALI-METAL SALTS OF ETHYLENE ACRYLIC ACID COPOLYMERS AS MEMBRANES

| Percent acrylic acid | Percent converted to NA salt | Thickness, mils | Percent efficiency [1] | IR drop at 25 a.s.f., mv. |
|---|---|---|---|---|
| 20 | 1/2 | 4 | 61 | 175 |
| 20 | 2/3 | 2 | 47 | 82 |
| ~15 | 1/3 | 2 | 59 | 353 |
| ~15 | 2/3 | 2 | 61 | 163 |

[1] Total N$_2$H$_4$ usage.

The hydrazine fuel cell of this invention is useful in a wide variety of fields depending, for example, upon the general type of hydrazine fuel cell battery, whether the battery is intended for portable or stationary operation and whether or not electric power (other than power obtained from the battery) is available.

Although the invention has been illustrated by the preceding examples, it is not to be construed as being limited to the materials employed therein, but rather the invention encompasses the generic area as hereinabove disclosed. Various modifications and embodiments of this invention can be made without departing from the spirit and scope thereof.

What is claimed is:

1. A fuel cell comprising, in combination, at least one hydrazine anode, at least one oxidant cathode, current collecting means associated with said anode and cathode, and an electrolyte containing hydrazine, said cathode being separated from said hydrazine in said electrolyte by a selective, ion permeable membrane, said membrane comprised of, in polymerized form, alkali-metal acrylate, acrylic acid, and ethylene in such amounts that said fuel cell can operate at hydrazine concentrations up to 30% in said electrolyte.

2. The fuel cell of claim 1 wherein said membrane is composed of, in polymerized form, about 8 to about 25 weight percent alkali metal acrylate, from about 2 to about 15 weight percent acrylic acid, and from about 75 to about 90 weight percent ethylene.

3. The fuel cell of claim 2 wherein said alkali-metal acrylate is sodium acrylate.

4. The fuel cell of claim 1 wherein said membrane is composed of an alkali metal salt of a copolymer of from about 10 to about 30 weight percent acrylic acid and from about 70 to about 90 weight percent ethylene, said copolymer having from about 25 to about 85 percent of the acid groups converted to said alkali-metal salt.

5. The fuel cell of claim 4 wherein said alkali metal is sodium.

References Cited

UNITED STATES PATENTS

| | | | |
|---|---|---|---|
| 2,978,402 | 4/1961 | Hoch et al. | 260—2.1EX |
| 2,980,635 | 4/1961 | Davis et al. | 260—2.1E |
| 3,368,922 | 2/1968 | Salyer | 136—86 |
| 3,442,711 | 5/1969 | Vielstich | 136—86 |
| 3,472,825 | 10/1969 | Walter et al. | 260—2.1EX |

ALLEN B. CURTIS, Primary Examiner

U.S. Cl. X.R.

136—146; 260—86.7